(No Model.) 2 Sheets—Sheet 1.

H. C. BAKER & J. R. ELBERG.
ELECTRICALLY PROPELLED VEHICLE.

No. 532,016. Patented Jan. 8, 1895.

Witnesses:
Inventors:
H. C. Baker and J. R. Elberg,
By Higdon & Higdon
Atty's (No Model.) 2 Sheets—Sheet 2.

H. C. BAKER & J. R. ELBERG.
ELECTRICALLY PROPELLED VEHICLE.

No. 532,016. Patented Jan. 8, 1895.

Witnesses:
F. G. Fischer
C. J. Thorpe

Inventors:
H. C. Baker and J. R. Elberg
By Higdon & Higdon
Attys.

UNITED STATES PATENT OFFICE.

HENRY C. BAKER AND JOHN R. ELBERG, OF KANSAS CITY, MISSOURI.

ELECTRICALLY-PROPELLED VEHICLE.

SPECIFICATION forming part of Letters Patent No. 532,016, dated January 8, 1895.

Application filed April 6, 1894. Serial No. 506,531. (No model.)

*To all whom it may concern:*

Be it known that we, HENRY C. BAKER and JOHN R. ELBERG, of Kansas City, Jackson county, Missouri, have invented certain new and useful Improvements in Electrically-Propelled Vehicles, of which the following is a full, clear, and exact description, reference being had to the accompanying drawings, forming a part hereof.

Our invention relates to electrically propelled vehicles, and it consists in certain peculiar and novel features of construction and combinations of parts, as will be hereinafter described and claimed, and the object of the invention is to produce, in combination with a light vehicle of any character or type, and an electric motor carried thereby, a mechanism which, deriving its motion from the motor, propels the vehicle at any suitable speed and with the least possible noise.

A further object of the invention is to produce a vehicle of this character which is simple, strong, and inexpensive of construction, and which may be thrown in and out of gear with the motor at will.

In order that the invention may be fully understood, we will proceed to describe it with reference to the accompanying drawings, in which—

Figure 1:
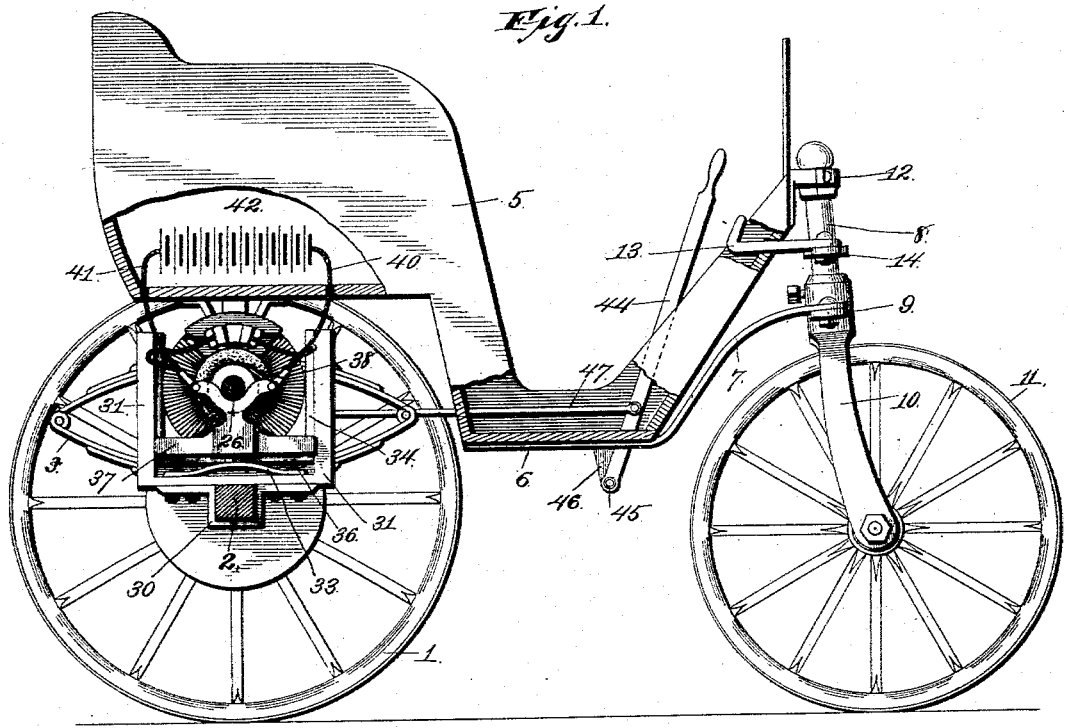
Figure 2:
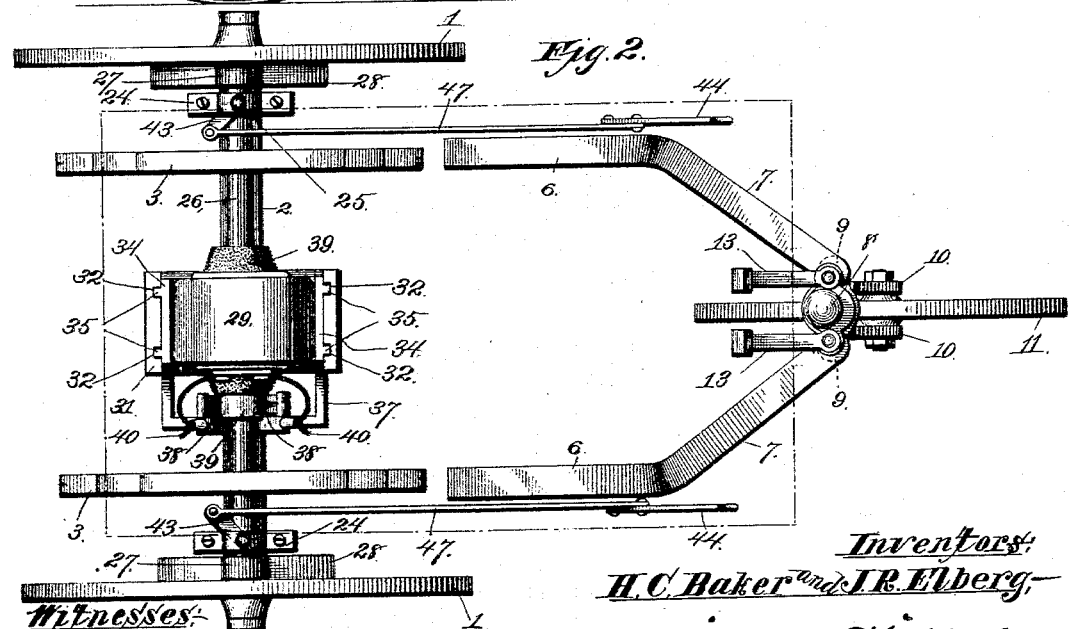
Figure 3:
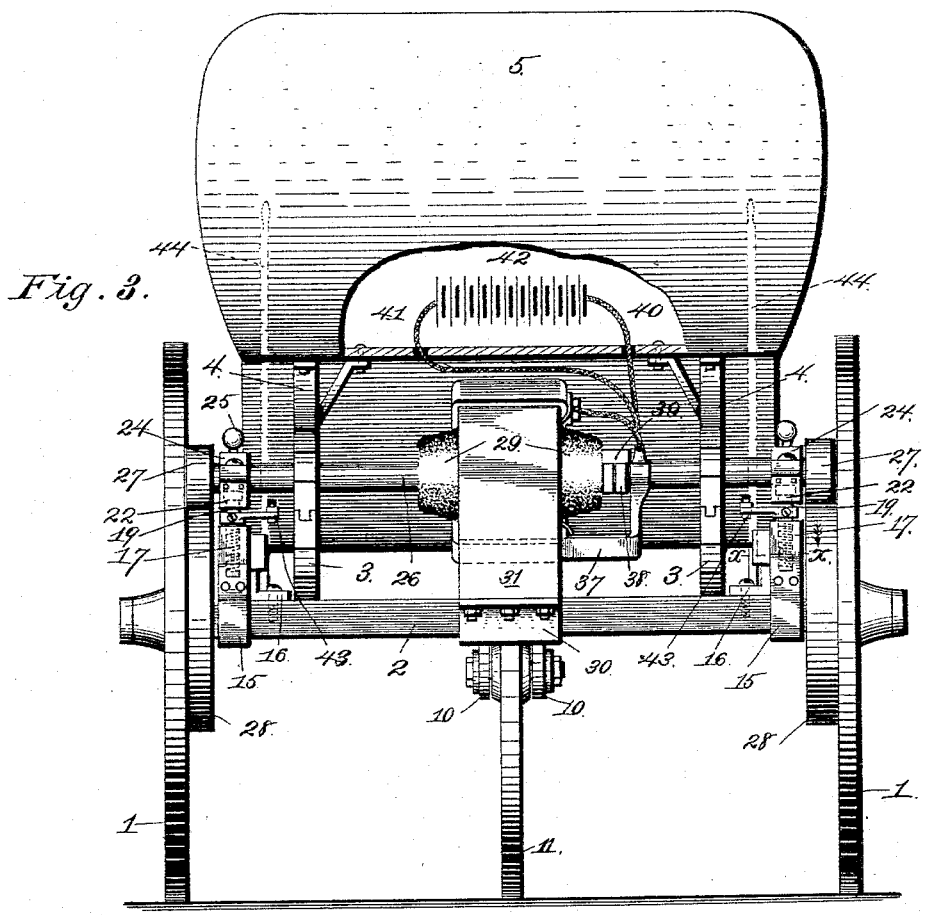
Figure 4:
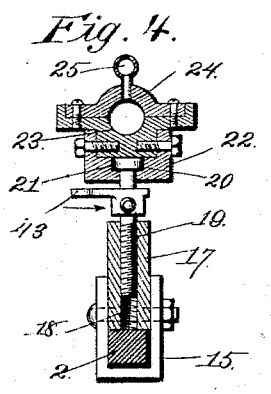
Figure 5:
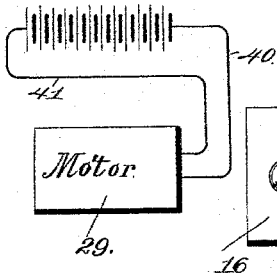
Figure 6:
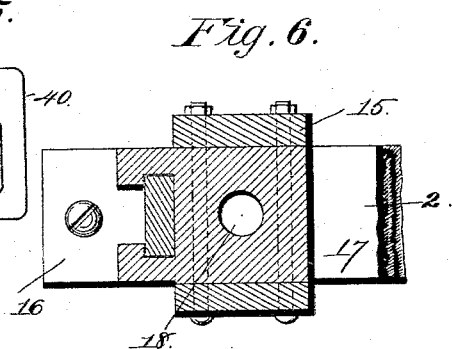

Figure 1. represents a view partly in section and partly in side elevation, of an electrically propelled vehicle, embodying our invention. Fig. 2. is a top plan view of the same, with the body of the vehicle removed. Fig. 3. represents a rear view of the vehicle on an enlarged scale. Fig. 4. represents a transverse section of the rear axle of the vehicle, and the mechanism for throwing the same at one side into or out of engagement with the motor. Fig. 5. is a view representing in diagram the motor and the battery. Fig. 6. is a horizontal sectional view, taken on the line $x$—$x$ of Fig 3.

In the said drawings, 1 designates the rear wheels, and 2 the axle connecting the same. 3 designates the longitudinally extending springs, which are secured in the ordinary manner upon the axle, and 4 designates brackets or castings, which are secured to and project upwardly from the upper side of said springs, and support the rear end of the vehicle body 5, which in this instance is in the form of a phaeton. The front portion of the phaeton body is supported upon the horizontal portions 6 of the front springs 7, which converge forwardly, and are pivotally secured to the ears 9, projecting from the opposite sides of a steering-head 8, and depending from said steering-head is a fork 10, which embraces and carries rotatably therein the front and guiding wheel 11. The upper end of the steering-head is also rotatably embraced by a bearing 12, carried at the front end of the phaeton-body, and extending longitudinally of and projecting through the front end of the same are a pair of foot-levers, which are pivotally connected at their front ends to the ears 14, projecting from opposite sides of the steering-head, so that pressure against one or the other of said levers will guide the vehicle in the direction desired.

A pair of U-shaped brackets 15 embrace the axle 2, one being located adjacent to the inner side of each wheel 1, and carried rigidly between the vertical arms of the said brackets, and also the brackets 16, arranged at the inner sides thereof, are the vertical standards 17, which are provided with the central and vertical screw-threaded passages 18, and these passages are engaged by the vertical lift-screws 19; the lift-screw 19 at the left-hand side of the vehicle, as viewed from the rear, being preferably a right-hand screw, and the one at the opposite side of the vehicle a left-hand screw, and these lift-screws are provided at their upper ends each with a cylindrical head or enlargement 20, which operatively engages a recess 21 formed in the upper side of the bracket or casting 22. A bearing comprises the lower member 23 and the upper member or cap 24, and the lower member is embraced by and bolted to the vertical arms of the casting 22, and bridges the upper side of the recess 21, occupied by the head or enlargement 20, and this bearing is supplied with oil through the cup 25. Arranged horizontally and extending transversely of the vehicle, and vertically above the rear axle 2, is the shaft 26, which finds a journal near its opposite ends in the bearing boxes just described, and mounted rigidly upon the outer ends of said shaft are the small friction-wheels 27, of leather or any other suitable material, which engage, when the vehicle is in motion, the large friction-wheels 28, bolted or otherwise rigidly secured to the inner side of the wheels 1, and mounted rigidly upon the shaft and centrally thereof, is the armature of a motor 29, and the support of the motor-frame I will now proceed to describe.

A U-shaped bracket 30 embraces the axle 2, and is bolted or otherwise rigidly secured to the under side of the bracket 31, which at its middle rests upon the said axle, and the front and rear arms of said bracket 31 are vertically grooved as shown at 32, at their inner sides, and the spring 33 rests upon the upper side of the horizontal bridge or base portion of said bracket. The motor-frame comprises the vertical side-arms 34, which fit snugly between and are embraced by the arms of the bracket 31, and said arms 34 are provided with vertical ribs at their outer sides, which engage the grooves 32 of said bracket, so as to prevent the lateral displacement of the motor, and the base or bridge portion 36 of said motor-frame is yieldingly supported by the spring 33. The function of the spring 33, is to relieve the shaft 2, of the weight of the motor-frame, by exerting a yielding and continuous upward pressure against the same. It is obvious, particularly in the case of a heavy motor-frame, that some support should be provided for the motor-frame. Otherwise the shaft sustaining all this weight at its middle might be bent or otherwise injured, and that any but a yielding or adjustable support would render the whole device inoperative, because the shaft must be vertically adjusted to throw the mechanism in or out of gear. Projecting laterally from the motor-frame, is the rectangular arm 37, to form a support for the brushes 38, which engage the commutator 39 of the motor. The motor is connected in the ordinary manner through the medium of the conductors or wires 40 and 41, with the opposite poles of the battery 42, which is removably mounted in the body of the vehicle below the seat, so as to be entirely out of the way of the occupant or occupants of the vehicle. This battery is preferably a storage or secondary battery of the ordinary type.

Secured rigidly to the lift-screws 19, between the upper ends of the standards and the lower side of the brackets or castings 22, and converging rearwardly, are the arms 43. A pair of levers 44 are arranged a suitable distance apart, and projecting downwardly through slots in the bottom of the vehicle-body adjacent to its front end, are pivotally mounted at 45 upon the depending brackets 46, which are carried rigidly by the body of the vehicle, and link-rods 47 extend through openings in the vehicle-body, and are pivotally connected at their rear ends to the inner ends of the arms 43, and at their front ends to the levers 44 a suitable distance above their pivotal points, as shown clearly in Fig. 1.

From this construction, it will be apparent, by pulling rearwardly upon the levers 44, owing to the opposite disposition of the lift-screws, that the rotating friction-wheels 27 will be moved downward into frictional engagement with the friction-wheels 28, and cause the vehicle to move forward, and that the forward movement of said levers will reverse the operation of said lift-screws, and raise the friction-wheels 27 out of engagement with the wheels 28. It will be further observed that when it is desired to turn the vehicle, say to the right, the guide-wheel 11 is turned by the proper operation of the foot-levers 13, and the lever 44 at the left-hand side of the vehicle is pushed forwardly, so as to raise the small friction-wheel 27 at the corresponding side of the vehicle out of engagement with the friction-wheel 28, which raises the motor-shaft a little higher at one end than the other, but this movement is so slight as not to affect the operation of the other friction-wheel 27.

In order to retard the movement of the vehicle when on a descending plane, and to stop the vehicle at any desired time or place, a motor-reversing mechanism of the ordinary construction will be employed, but as this motor-reversing mechanism forms no part of this invention it is deemed not necessary to describe it in this application.

From the above description, it will be apparent that we have produced an electrically propelled vehicle which is simple, strong and inexpensive of construction, and which, by reason of the mutually engaging friction-wheels 27 and 28, will be propelled with the least possible noise.

Having thus described our invention, what we claim as new, and desire to secure by Letters Patent, is—

1. An electrically propelled vehicle, comprising a wheeled frame, a motor carried thereby, a bracket carried by the rear axle of said frame, a spring carried by said bracket, a motor yieldingly supported upon said spring, and electrically connected to the battery, small friction-wheels mounted upon the motor-shaft, and large friction-wheels carried rigidly by the wheels of the frame journaled loosely upon the said axle, substantially as set forth.

2. An electrically propelled vehicle, comprising a wheeled frame, a bracket carried by the rear axle of said wheeled frame, a spring carried by said bracket, a battery located in the body of the vehicle, a motor mounted upon said spring and between the arms of said bracket, and electrically connected to said battery, friction-wheels mounted upon the shaft of the motor, and friction-wheels carried by the wheels of said axle, screw-threaded standards supported upon said axle, lift-screws engaging the same, bearing-boxes carried by said lift-screws and engaging the motor-shaft near its opposite ends, arms mounted rigidly upon said lift-screws, and means to operate the same so that the motor-shaft will be raised or lowered, substantially as set forth.

In testimony whereof we affix our signatures in presence of two witnesses.

HENRY C. BAKER.
JOHN R. ELBERG.

Witnesses:
G. Y. THORPE,
M. R. REMLEY.